Figure 1:
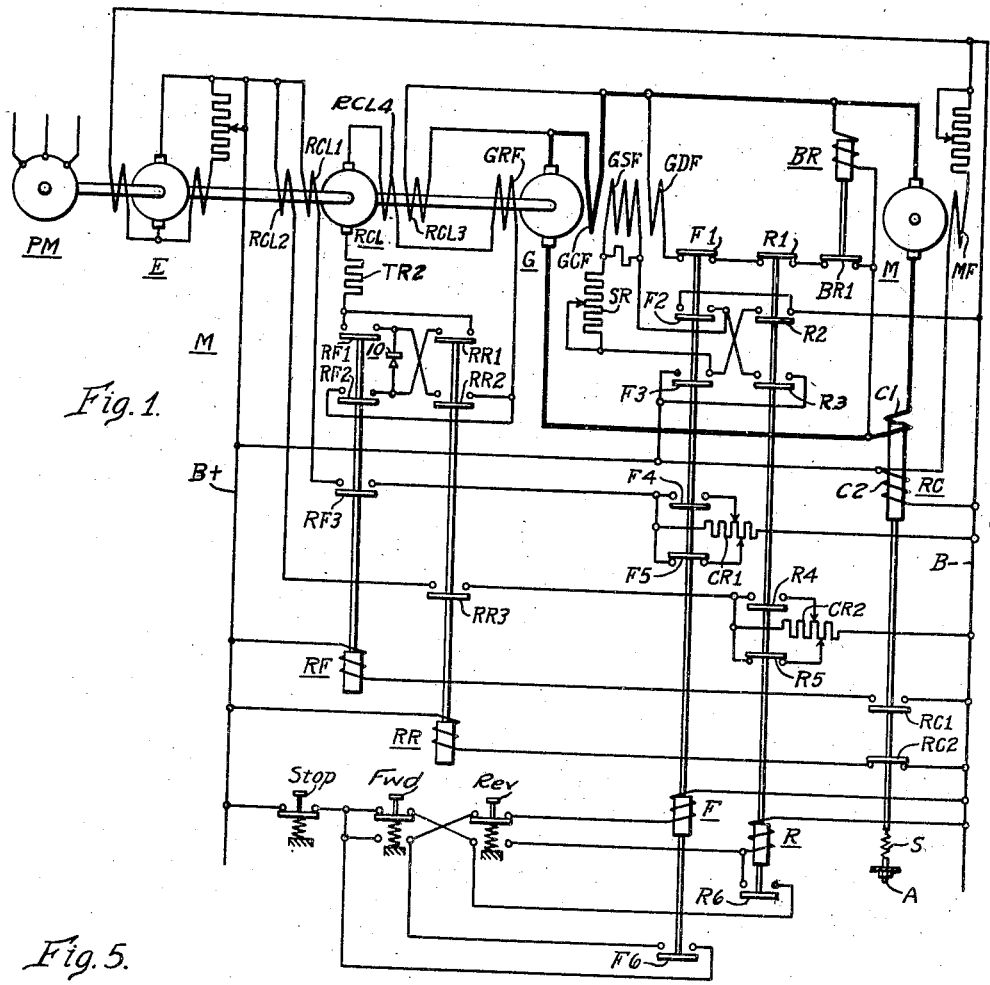

Aug. 27, 1946.

G. E. KING 2,406,425

CONTROL SYSTEM

Filed Oct. 17, 1944

2 Sheets-Sheet 1

WITNESSES:
C. J. Weller.
E. F. Oberheim.

INVENTOR
George E. King.

BY
Paul E. Friedemann
ATTORNEY

Patented Aug. 27, 1946

2,406,425

UNITED STATES PATENT OFFICE 2,406,425

CONTROL SYSTEM

George E. King, Swissvale, Pa. assignor to Westinghouse Electric Corporation, East Pittsburgh, Pa., a corporation of Pennsylvania Application October 17, 1944, Serial No. 559,066

11 Claims. (Cl. 172—179)

The present invention relates to variable voltage control systems and more particularly to a variable voltage drive for operating or automatically controlling the operation of motors connected to various types of mechanical loads. In certain of its aspects this invention is related to a copending application of George E. King and William H. Formhalls, Serial No. 559,068, filed on the same date as this application and entitled, Control systems (W. E. Case 23,453), to a copending application of George E. King, Serial No. 559,065 also filed on the same date as this application and entitled, Control systems (W. E. Case 23,232), and to another copending application of George E. King, Serial No. 559,067, filed on the same date as this application and entitled Control system (W. E. Case 23,418).

This invention provides certain improvements in variable voltage control systems in which rotating regulators are employed to regulate certain electrical quantities of the system, and the invention as hereinafter described and as illustrated in the drawings is specifically directed to a control for a direct current motor embodying provisions for limiting the motor armature current whether the motor is operating normally as a motor or during regenerative periods when the motor is being overhauled by its mechanical load and driven as a generator. In certain forms of the invention hereafter disclosed, automatic speed regulation of the motor is provided in conjunction with current limiting protection. It will be apparent to one skilled in the art that the invention is not necessarily limited to speed regulation alone since various modifications of the systems may be made to control the motor torque or power in conjunction with the current limiting features mentioned. It will further be apparent that the invention is not necessarily limited to motor control since automatic regulation of the voltage current or electrical power supplied to an electrical load of substantially any type susceptible of regulation may be had.

In one form of the invention illustrated speed regulation of the motor is obtained by means of a speed regulating rheostat which is connected in series with the main generator shunt field. The speed of the motor may thus be varied by varying the amount of the series resistance, thereby changing the excitation of the main control field winding of the generator which supplies the motor. The current in the motor armature circuit is limited by means of a small rotating regulator which is operative once a predetermined motor armature current is attained to so energize a regulating field winding for the main generator as to control the output current of the main generator to prevent excessive motor armature currents whether the motor is functioning normally as a motor or being overhauled by its mechanical load and driven as a generator.

In another form of the invention illustrated, the speed of the motor M is automatically controlled at some constant value determined by the speed controlling rheostat by means of a rotating regulator which is operable upon a departure of the motor speed from the selected constant speed to regulate the excitation of the main generator field windings to increase or decrease the electrical output of the main generator to effect a constant speed of the motor. Current limiting protection is here provided by means of a rotating regulator which energizes a regulating field winding on the main generator in such a direction as to maintain the motor armature currents within permissible values for both normal and overhauling operation of the motor.

A third form of the invention illustrated in the drawings provides automatic speed regulation of the motor by means of a speed regulating generator as discussed in connection with the preceding or second form of the invention. Current limiting protection is here provided by means of a rotating regulator which acts upon a regulating field winding of the speed regulating generator. The electrical output of the speed regulating generator and thus the excitation of the main generator field windings is controlled in a manner to maintain the motor armature currents within permissible values for both normal and overhauling operation of the motor.

In the first form of the invention illustrated, magnetic controllers are provided which operate to reversibly excite the main generator shunt field winding. This reverses the motor armature currents and hence reverses the rotation of the motor. The second and third forms of the invention illustrated, in the interest of simplicity, are not provided with magnetic controllers for reversing the operation of the motor. It will be apparent, however, that such reversing control may be provided without departing from the spirit and scope of the teachings of this invention.

A principal object of this invention is to provide a variable voltage drive for a motor in which the motor armature currents are automatically limited within permissible values.

Another object of this invention is to provide a variable voltage drive including a motor in which automatic speed regulation of the motor is provided in conjunction with automatic regulation of the motor current.

Still another object of this invention is to provide a variable voltage drive of the character referred to which provides a wide range of speed regulation for a motor in conjunction with protection against excessive motor armature currents.

A specific object of this invention is to provide a variable voltage drive utilizing rotating regulators for regulating the speed of a motor and limiting the motor armature current, in which the rotating regulator controlling the motor currents requires a certain value of excitation of its field windings in accordance with motor armature currents before a corrective output thereof is obtained.

Another specific object of this invention is to provide a variable voltage drive of the character mentioned in which accurate adjustment of the maximum accelerating current between certain limits is obtained.

Yet another specific object of this invention is to provide a variable voltage drive in which accurate adjustment of the maximum braking currents between certain limits is obtained.

A further specific object of this invention is to provide a variable voltage drive including means for independently adjusting both the accelerating and braking current.

Figure 5:
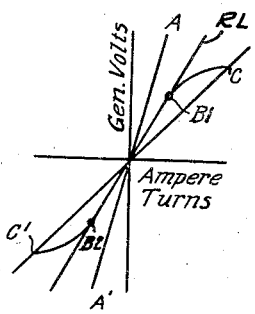
Figure 4:
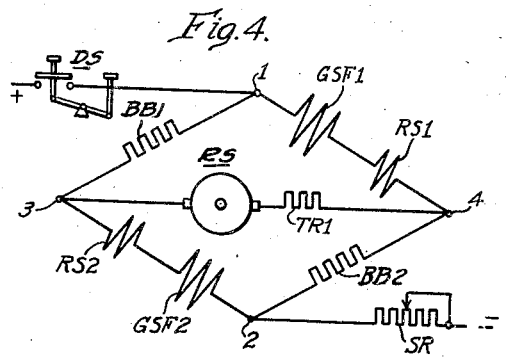
Figure 6:
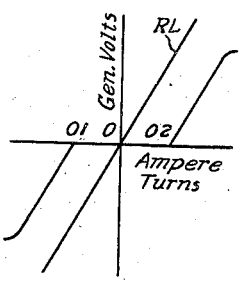
Figure 2:
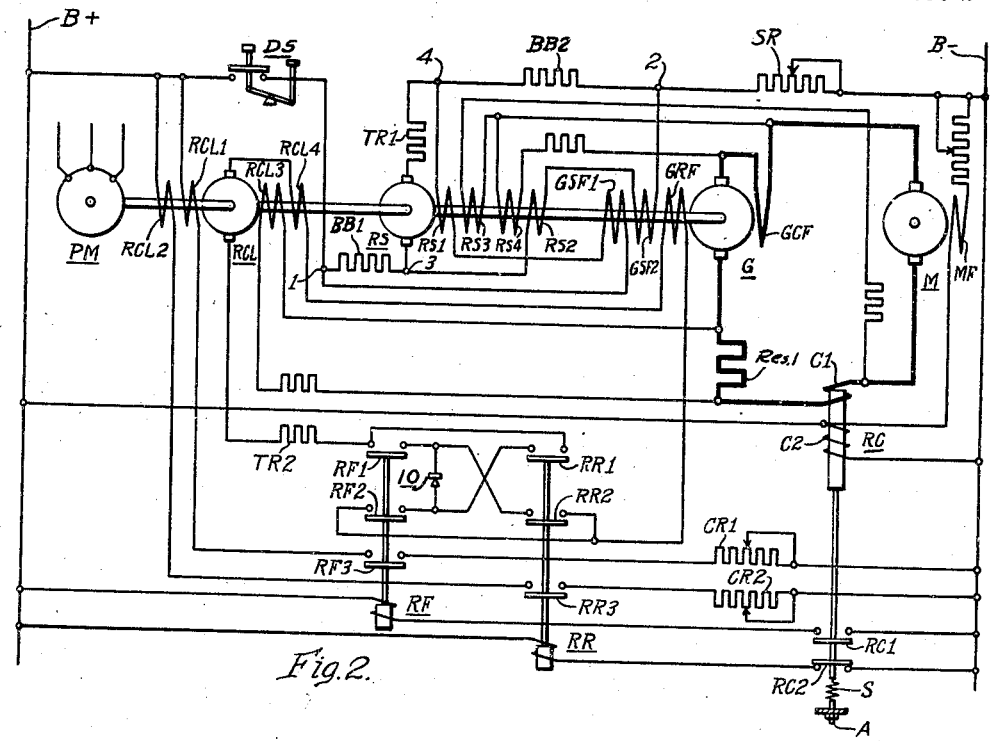
Figure 3:
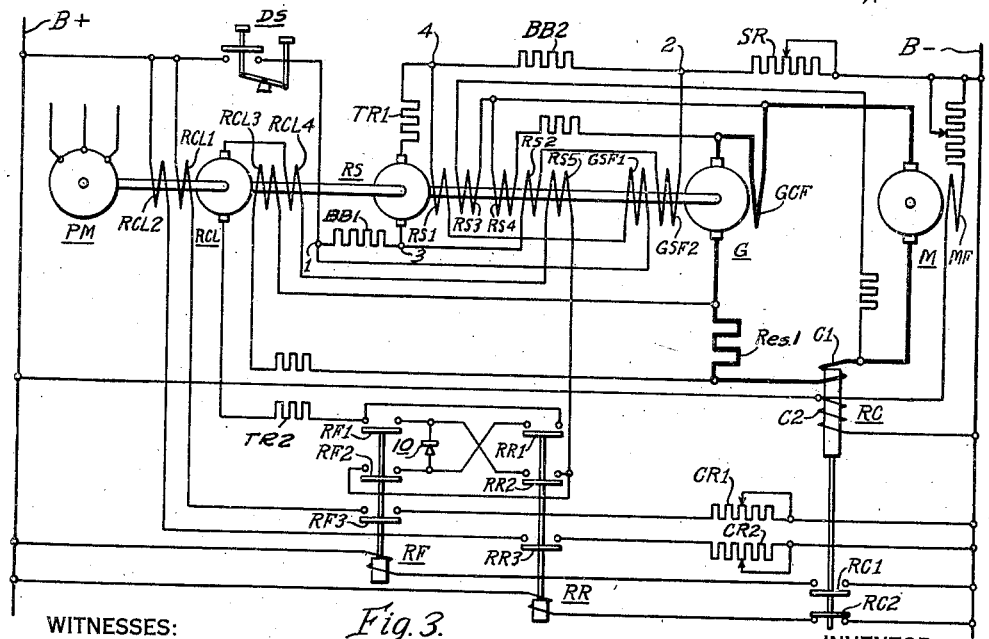

Other objects and advantages will become apparent upon a study of the following disclosure when considered in conjunction with the accompanying drawings, in which:

Figure 1 schematically illustrates a variable voltage drive embodying the fundamental principles of this invention, Fig. 2 is a modification of the invention of Fig. 1 embodying automatic speed regulation of the motor, Fig. 3 is a modification of the invention of Fig. 2, Fig. 4 diagrammatically illustrates the connections of certain elements of the variable voltage drive, Fig. 5 graphically illustrates the operating characteristics of the speed regulating generator, and Fig. 6 graphically illustrates the operating characteristics of the current limiting regulating generator with variable voltage drive.

The variable voltage drive illustrated in the drawings provides current limiting protection under all possible operating condition, some of these conditions are as follows:

1. Acceleration of the motor from zero speed to some preset speed.
2. Acceleration of the motor from preset speed to a higher speed by movement of the speed controlling rheostat.
3. Braking of the motor to zero speed.
4. Braking of the motor from some preset speed to a lower speed by moving the speed controlling rheostat.
5. Plugging of the motor from one direction to the other.

The variable voltage drive illustrated in Figure 1 of the drawings utilizes a four-unit motor-generator set consisting of a constant speed alternating current driving motor or prime mover PM, an exciter E, a generator G including two separately excited control field windings GSF and GRF, one of which GSF provides the main generator flux and the other GRF the regulating flux, a differential or suicide field winding GDF which neutralizes the residual voltage of the main generator and a commutating field winding GCF, and finally a current limiting regulating generator RCL having a field winding RCL3 connected to be energized according to the current circulating in the motor generator armature circuit, an armature current excited field winding RCL4 and two calibrating field windings RCL1 and RCL2. The direct current motor M is electrically connected in a series loop to the main generator armature and its separately excited field winding MF is connected across the exciter.

The regulating generator designated RCL is used as a current limiting device. The field winding RCL3 may be connected as shown in parallel with the generator commutating field winding GCF or in parallel with a resistor in series with the motor and generator armatures as shown in Figures 2 and 3 of the drawings. The function of the field winding RCL3 is to measure the motor armature current. The two shunt fields RCL1 and RCL2 which may be termed, calibrating fields, are respectively connected across the exciter circuit in series with the adjustable calibrating resistors CR1 and CR2. The function of these fields is to provide a means of comparison for the field winding RCL3. The circuit is so arranged that the flux from the field RCL3 is always in the opposite direction to the flux from one of the two calibrating fields RCL1 and RCL2. As will hereafter become apparent, the current limiting regulating generator does not generate any current until the flux from the field winding RCL3 is greater than the flux from one of the calibrating fields. This regulating generator, therefore, does not affect the operation of the main generator or motor until the flux from the field RCL3 is in excess of the flux from one of the calibrating fields. The calibrating resistors CR1 and CR2 are the means used to preset the maximum permissible motor armature current. The resistor taps connected in series with the make contacts F4 and R4 of the forward and reverse contactors F and R set the accelerating current while the taps in series with the break contacts F5 and R5 of the F and R contactors respectively, set the braking current.

The current limiting regulating generator armature is connected in series with its armature current excited field RCL4, the regulating field winding GRF for the main generator G, a rectifier 10, the polarity of which in this series circuit is reversible through the contact members RF1 and RF2 of the forward relay RF and a resistor TR2 which is of a suitable resistance value to provide certain desired operating characteristics for the current limiting regulating generator. These operating characteristics will be hereafter discussed in detail.

The reverse current relay RC is provided with two coils C1 and C2 of which the coil C2 is connected across the exciter buses B+ and B−, and hence energized with exciter potential. The coil C1 is connected in series with the generator and motor armatures. The polarity of the shunt coil C2 is fixed. The current in the series coil C1 may be in either direction depending upon the direction of the operation of the motor and whether or not the motor is accelerating or regenerating. This reverse current relay may, for example, be adjusted to pick up when the shunt coil C2 is energized by the exciter voltage plus 10% of the full load motor armature current aiding the shunt coil. The relay may be adjusted to drop out with 10% of full load motor armature current in the series coil opposing the shunt coil. The reverse current relay is biased to its deenergized position by means of a tension spring S, the tension of which may be varied to change the operating characteristics of this relay as desired by means of a suitable adjusting means, such as that designated A.

The coils of the forward and reversing contactors F and R are connected across the exciter buses B+ and B— through the Stop, forward and reversing push buttons. The forward and reversing push buttons when depressed respectively energize the forward and reversing contactors F and R to effect rotation of the motor in the desired direction. The coils of the forward and reversing relays are respectively energized through the medium of contacts on the RC relay. When this relay is energized or deenergized, as previously noted, the RF and RR relays select the proper polarity of the rectifier 10 in the armature circuit of the current limiting generator.

Before proceeding with the discussion of the operation of the control system, an understanding of the function and characteristics of the regulating generator RCL should be had. This generator, as illustrated, is a series generator. Stable operation of a series generator is obtainable only if the resistance line of the field circuit is less than that of a line tangent to the initial straight line portion of the no-load saturation curve of the generator. If the resistance is higher, as indicated by the line AA' in Figure 5, the generator voltage cannot build up. If the resistance is lower, the generator open circuit voltage will be that determined by the intersection of the resistance line of the field circuit with the saturation curve, for example, the points CC'. If the resistance line designated RL of the field circuit is tangent to the no-load saturation curve, the generator can theoretically have an open circuit voltage equal to the ordinate of any of the points of tangency, for example, the points B1 and B2.

While this would be undesirable in a standard generator, it is an ideal operating characteristic for a regulating generator since then the purpose of the control field windings that is one of the control field windings RCL1 or RCL2 and the winding RCL3 becomes that of locating the proper operating point of a series generator including an armature current excited field such as RCL4 and the armature, keeping this operating point constant for a given condition and supplying the required amount of power to the connected field winding of the main generator. With the resistors CR1 and CR2 in the field circuits of the calibrating fields selected to provide the desired exciting current in these windings and one of the circuits closed depending upon whether the motor is functioning normally or being overhauled, the voltage in the regulating generator armature tends to rise rapidly because the excitation of the energized field is added to the effect of the armature current excited field. This voltage, in the instant case, however, is prevented from energizing the field GRF connected in series with the armature of this generator, by means of the rectifier 10 which is always connected to oppose the voltage thus generated. The overall operating characteristic of the generator thus becomes that illustrated in Figure 6 in which the generator voltage is zero for a selected value of the total ampere turns of the field circuits. This range of the zero voltage extends over a range of total ampere turns in one direction from the origin designated 0 to the point 02 on the abscissa to the right and in the opposite direction on the abscissa to the point 01. With respect to the point 02, the ampere turns produced, for example, by the calibrating field RCL1 are directed to the left towards the ordinate and the ampere turns of the winding RCL3 are directed to the right or, in other words, in opposition to the ampere turns of the field RCL1. Thus, when the ampere turns of the winding RCL3 exceed those of the winding RCL1, a voltage is generated in the armature of the current limiting regulating generator of such polarity that a current may flow through the rectifier 10 and thus energize the winding GRF of the main generator. When the motor armature current which produced the overbalancing excitation of the winding RCL3 is reduced to some permissible value, the excitation of the winding RCL3 falls below the value necessary for its ampere turns to overbalance those of the winding RCL1. As a result, this generator again generates a voltage in such a direction that the resulting current is blocked by the rectifier 10. Hence, the excitation of the field winding GRF drops to zero.

Assuming now that the prime mover PM is up to speed and the exciter voltage is normal, pressing the forward push button will cause the relay F to close and energize the main field winding GSF of the generator G to operate the motor in the forward direction. This circuit is established from the exciter bus B+ through the contact members F3, the speed controlling rheostat SR, the field winding GSF, the contact members F2 and thence to the other side of the exciter or bus B—. The contact members F1 open the circuit for the shunt connected differential field GDF to remove the effect of this field winding from the generator. Contact member F4 selects the correct value of the calibrating resistor CR1 in series with the calibrating field RCL1 of the RCL generator to permit acceleration of the motor at predetermined motor armature currents. As the motor armature current builds up, the relay RC picks up closing its contact members RC1 and thereby causing the relay RF which has its coil in series with these contacts across the exciter buses to pick up. The relay RF closes its contact members RF3 and connects the calibrating field RCL1 in conjunction with the contacts F4 across the exciter buses. The contact members RF1 and RF2 upon closing connect the rectifier 10 in the series armature circuit of the current limiting generator such that its polarity opposes that of the voltage generated as a result of the excitation of the calibrating field RCL1. Thus, no current flows because the resulting current is opposed by the rectifier. As the motor armature current increases it approaches the predetermined accelerating value. The flux produced by the field winding RCL3 now becomes greater than that produced by the calibrating field RCL1. As a result, the regulating generator armature voltage is reversed and current is circulated through the regulating field GRF of the main generator producing a flux in the generator to oppose the flux set up by the main generator field GSF, thus, the generator voltage is prevented from changing too rapidly and the accelerating current is limited to the value determined by the strength of the calibrating field RCL1. The motor accelerates at the preset current until it approaches the speed set by the speed controlling rheostat. The accelerating current decreases below the maximum set value and the regulating generator becomes ineffective. At this point, the motor armature current decreases to normal load current.

Assuming now that the operator wishes to increase the speed of the motor M and adjusts the speed controlling rheostat SR such that its effective resistance value is decreased, the motor current increases and is limited by the current limiting generator in the same way hereinbefore described.

If the operator wishes to decrease the speed of the motor and inserts more of the speed controlling rheostat in series with the field winding GSF, the motor armature currents drop. Under these conditions, the motor M may be overhauled by the load which it is driving and thus caused to function as a generator and regenerate through the generator. This causes the reverse current relay to drop out deenergizing the relay RF at the reverse current relay contact members RC1 and energizing the relay RR at the back contact members RC2. The relay RR at its contact members RR3 in conjunction with the closed back contact members R5 of the reverse contactor R energizes the calibrating field RCL2, and by means of its contact members RR1 and RR2 reverses the connection of the rectifier in the armature circuit of the current limiting generator. When the motor armature currents approach the predetermined braking value, the flux set up by the field RCL3 is now greater than that set up by the calibrating field RCL2. The armature voltage of the current limiting generator is reversed and current will flow through the regulating field GRF of the main generator, producing a flux in the generator in the same direction as the flux set up by the field GSF of the main generator. This flux tends to maintain the generator voltage and prevent it from decaying too fast, and so limits the braking current. As the speed of the motor approaches the lower speed, the motor current decreases and finally reverses and settles down at low current. The regulating generator thus becomes ineffective as soon as the motor current armature falls below the limiting value. The reverse current relay RC again picks up and closes the relay RF and at the same time deenergizes the relay RR.

Now assuming that the Stop button is pressed, this opens the energizing circuit for the coil of the forward contactor F causing this relay to drop out and deenergize the main field GSF of the generator G. The motor armature current, due to overhauling the motor, reverses causing the relay RC to drop out. The relay RF drops out and the relay RR closes. The action now is substantially the same as when the rheostat SR was set for a lower motor speed. The only difference is that the motor breaks down to some very low speed at which the voltage across the motor armature terminals is no longer sufficient to hold the BR relay in its energized position. The relay BR drops out closing its contact members BR1 to, in conjunction with the contacts F1 and R1 now both closed, connect the differential field GDF across the generator thus quickly bringing the motor to zero speed and preventing creeping.

To reverse the direction of the motor the reverse push button is pressed. This energizes the relay R which closes its contacts R6 to form a holding circuit for the coil of the R relay. The contact members R2 and R3 reverse the connection of the field GSF and the contact members R1 disconnect the differential field GDF. The reversing operations from this point on are analogous to the forward operation hereinbefore described.

A study of the variable voltage drive disclosed reveals that the RCL generator limits the motor accelerating and braking current regardless of the direction of operation of the motor. The reverse current relay RC, by means of the RF and RR relays, automatically selects the correct calibrating field for the RCL generator and also connects the rectifier 10 in the armature circuit of the RCL generator for the proper polarity. The current limiting generator RCL has no effect upon the main generator unless the accelerating or braking current approaches the preset limit.

A variable voltage drive such as disclosed in Figure 1 can be utilized in conjunction with a second rotating regulator operable to automatically regulate the speed of the motor. A variable voltage drive of this type is illustrated in Figure 2 of the drawings. In this figure, parts having a function similar to those of corresponding parts in Figure 1, are given reference characters similar to those of Figure 1. In this embodiment of the invention the current limiting generator RCL is similar to that of Figure 1 and is again provided with the calibrating field windings RCL1 and RCL2. The field winding RCL3 in this instance is excited by the drop across the resistor Res 1 connected in series in the motor generator armature circuit. Hence, this field is again energized according to the magnitude of the current circulating in the motor armature. The self-energizing field winding RCL4 is again connected in series with a regulating field GRF on the main generator through the relays RF and RR and the series connected tuning resistor TR2 as in Figure 1. Hence, further description of this machine elaborating upon its operating characteristics in this embodiment of the invention is believed unnecessary.

The speed regulating generator RS is also driven at a constant speed by the prime mover PM and is provided with armature current excited field windings RS1 and RS2 which are connected as will more conveniently be seen in Figure 4, respectively, in series with generator shunt field windings GSF1 and GSF2 in opposite legs of a conventional Wheatstone bridge circuit which has for its other two opposite legs the bridge balancing resistors BB1 and BB2. The armature winding for the generator RS is connected in series with a tuning resistor TR1 across the terminals 3 and 4 of the bridge circuit. This tuning resistor like TR2 so establishes the field resistance as to provide operating characteristics of the RS generator as indicated in Fig. 5. The input terminals 1 and 2 of this bridge circuit are connected across the exciter buses B+ and B— through the medium of a disconnect switch DS and the speed controlling rheostat SR. This speed regulating generator functions according to the operating characteristics graphically illustrated in Figure 5. Hence, its operation will be understood in connection with the discussion previously made in connection with Figure 5. Since no provision is herein provided, such as a rectifier 10 for blocking the generated currents of this speed regulating generator, the function of the control field windings RS3 and RS4 becomes that of determining the operating point along the no-load saturation curve of this region and keeping this operating point constant for a given excitation of these fields.

As previously noted, the speed of the motor is to be regulated, thus an indication of the counter-voltage of the motor is desired since the counter-voltage indicates the departure in speed of the motor from the desired value. The counter E. M. F. is determined by the differential of the IR drop of the motor armature and the motor armature terminal voltage. This is obtained by connecting the field winding RS4 across the generator commutating field GCF. Since the current flowing through this field winding also flows through the motor armature and the magnitude of this current depends upon the effective electrical resistance of the motor armature, the voltage drop across the generator commutating field varies according to the IR drop of the motor armature. Hence, the field RS4 of the speed regulating generator is energized by a voltage corresponding to the IR drop of the motor armature. The field winding RS3 is connected directly across the motor armature terminals and thus is energized according to the voltage drop thereacross. This field winding RS3 is differentially connected with respect to the field winding RS4 and the field windings RS1 and RS2. Hence, the differential excitation resulting from the differentially unbalanced ampere turns of the windings RS3 and RS4 is an indication of the counter E. M. F. of the motor and thus an indication of the departure in speed of the motor from the selected value, which selected value is again determined by the setting of the speed controlling rheostat. When the motor speed is correct the differential ampere turns match those of the cumulative ampere turns and the generator voltage is maintained at that point. Referring again to Figure 4, it will be apparent that when the disconnect switch DS is closed, the field windings of the main generator and the speed regulating generator connected in the opposite legs of the bridge circuit are excited by a current which depends upon the setting of the speed rheostat SR. As a result, the windings RS1 and RS2 have a voltage thereacross which indicates the desired speed of operation of the motor. This voltage is termed the pattern voltage. When the motor speed is other than that indicated by the setting of the speed controlling rheostat and as follows the pattern voltage of the windings RS1 and RS2, a voltage is generated in the armature of the speed regulating generator RS in such a direction as to circulate a current through its armature connected across the output terminals 3 and 4 of the bridge circuit, through the field windings of the speed regulating generator and of the main generator to thus either add or subtract to the total excitation of the main generator. As the motor speed approaches the preset value, the differential excitation resulting from the fields RS3 and RS4 neutralizes the pattern excitation of the windings RS1 and RS2. The output of the regulating generator is thus maintained at some new point on the curve of the operating characteristics and this point remains unchanged until the motor speed again departs from the preselected value. The current limiting generator RCL again functions in the manner hereinbefore described in connection with Figure 1, to so excite the regulating field GRF of the main generator to limit the motor armature currents within permissible values. The relays RC, RR and RF function in the capacity discussed in connection with Figure 1. Hence, further elaboration on this point is believed unnecessary.

In the embodiment of the invention illustrated in Figure 3 of the drawings, the field winding GRF of the main generator G is eliminated and an additional field winding RS5 applied to the speed regulating generator. This winding is energized as is the winding GRF in Figure 2 by the current limiting generator RCL depending upon the value of the current circulating in the motor armature circuit, and hence, the voltage drop across the resistor R1. The field winding RS5 either adds or subtracts to the total excitation of the speed regulating generator to thus limit the currents which may circulate through its self-energizing fields and the main generator fields connected in the electrical bridge circuit. As a result, the motor armature currents are again limited within permissible values. Here again the RC, RR and RF relays function to control their associated circuit elements in the manner hereinbefore discussed in connection with Figure 1.

The foregoing disclosure and the showings made in the drawings are merely illustrative of the principles of this invention and are not to be considered in a limiting sense, the only limitations are to be determined by the scope of the appended claims.

I claim as my invention:

1. In a variable voltage drive, the combination of, a motor, a generator for energizing the motor, means for controlling the electrical output of the generator to effect different speeds of operation of the motor, a regulating generator for limiting the magnitude of the electrical current supplied to the motor by said generator and rectifier means disposed to block the electrical output of the regulating generator excepting when the current supplied by the generator to the motor exceeds a predetermined value.

2. In a variable voltage drive, the combination of, a motor, a main generator for energizing the motor, means for controlling the electrical output of the main generator to effect different speeds of operation of the motor, an auxiliary generator responsive to an electrical quantity of the motor for effecting a control of said motor when said electrical quantity exceeds a certain value, and a rectifier for blocking the electrical output of the second generator excepting when said electrical quantity exceeds said certain value.

3. In a variable voltage drive, the combination of, a motor, a main generator for energizing the motor, field winding means for the main generator, means for supplying electrical energy to a portion of the field winding means for regulating the speed of said motor, an auxiliary generator for energizing another portion of the field winding means of the main generator, an armature current energized field winding and a pair of differentially connected control field windings for the auxiliary generator, means for adjusting the resistance line of the armature current energized field winding circuit that it is tangent to the initial substantially straight line portion of the no-load saturation curve of the auxiliary generator, means for supplying electrical energy of constant magnitude to one of said pair of control field windings, means for energizing the other of said pair of control field windings according to an electrical quantity of said motor, and means including a rectifier for blocking the electrical output of the auxiliary generator until said electrical quantity reaches a predetermined value.

4. In a variable voltage drive, the combination of, a motor, a main generator for energizing the motor, a field winding means for the main generator, means for supplying electrical energy to a portion of said field winding means for regulating the speed of said motor, an auxiliary generator for controlling an electrical quantity of the motor, an armature current energized field winding and a pair of differentially connected control field windings for the auxiliary generator, means for adjusting the armature current energized field winding such that its resistance line is tangent to the initial straight line portion of the no-load saturation curve of the auxiliary generator, means for supplying electrical energy to one of said pair of control field windings, means for energizing the other of said pair of control field windings according to said electrical quantity of said motor and means including a rectifier for blocking the electrical output of said auxiliary generator excepting when said electrical quantity reaches a certain value.

5. In a variable voltage drive, the combination of, a motor, a main generator for energizing the motor, field winding means for the main generator, means for reversibly supplying electrical energy to a portion of the field winding means for regulating the speed of said motor in each direction, an auxiliary generator including an armature current energized field winding, a pair of selectively energized field windings, and a control field winding, means for adjusting the armature current energized field winding such that its resistance line is tangent to the substantially straight line portion of the no-load saturation curve of the auxiliary generator, means for selectively energizing said pair of field windings according to the direction of rotation of said motor, means for energizing said control field winding according to an electrical quantity of the motor, and a rectifier for blocking the electrical output of the auxiliary generator excepting when said electrical quantity reaches a predetermined value.

6. In a variable voltage drive, the combination of, a motor, a main generator for energizing the motor, field winding means for the main generator, means for supplying electrical energy to one portion of the field winding means for the main generator to regulate the speed of said motor, a regulating generator responsive to an electrical quantity of the motor for controlling the excitation of another portion of the field winding means for the main generator, said regulating generator having a pair of selectively energized field windings, a control field winding and an armature current energized field winding; means for adjusting the resistance line of the armature current energized field winding such that it is tangent to the no-load saturation curve of the auxiliary generator, a rectifier, means for supplying electrical energy to one of said pair of field windings and at the same time connecting said rectifier to oppose the output current of the regulating generator resulting from the excitation thereof from the selected one of said pair of field windings.

7. In a variable voltage drive, the combination of, a motor, a main generator for energizing the motor, field winding means for the main generator, means for supplying electrical energy to one portion of the field winding means for the main generator to regulate the speed of said motor, a regulating generator responsive to an electrical quantity of the motor for controlling the excitation of another portion of the field winding means for the main generator, said regulating generator having a pair of selectively energized field windings, a control field winding and an armature current energized field winding; means for adjusting the resistance line of the armature current energized field winding such that it is tangent to the no-load saturation curve of the regulating generator, a rectifier, means for supplying electrical energy to one of said pair of field windings and at the same time connecting said rectifier to oppose the output current of the regulating generator resulting from the excitation thereof from the selected one of said pair of field windings, said last named means including a reverse current relay having a coil energized according to the current supplied to said motor by the main generator, and a coil excited by a constant potential, said relay being picked up when the current coil is excited by a certain motor current in a direction to aid the potential coil and being dropped out when the current coil is energized by a certain motor current the reverse of that for picking up the relay, said reverse current relay effecting selective energization of said pair of field windings.

8. In a variable voltage drive, the combination of, a motor, a main generator for energizing the motor, field winding means for the main generator, a first regulating generator responsive to electrical quantities of the motor for supplying electrical energy to a portion of said field winding means, means for supplying electrical energy of an adjustably constant value to said same portion of the field winding means, a second regulating generator responsive to an electrical quantity of the motor for energizing another portion of the field winding means for the main generator, and a rectifier disposed to oppose the electrical output of the second regulating generator excepting when the motor electrical quantity to which the second regulating generator is responsive approaches a predetermined value.

9. In a variable voltage drive, the combination of, a motor, a main generator for energizing the motor, field winding means for the main generator, a first regulating generator responsive to electrical quantities of the motor for supplying electrical energy to a portion of said field winding means, means for supplying electrical energy of an adjustably constant value to the same portion of the field winding means, a second regulating generator responsive to an electrical quantity of the motor for controlling the electrical output of the first regulating generator, and a rectifier disposed to oppose the electrical output of the second regulating generator excepting when the electrical quantity of the motor to which the second regulating generator responds approaches a predetermined value.

10. In a variable voltage drive, the combination of, a motor, a main generator for energizing the motor, field windings for the main generator, a first regulating generator, an armature winding and field windings for the first regulating generator, an electrical bridge circuit, a field winding of the main generator and a field winding of the first regulating generator being connected in series in one leg of the bridge circuit, another field winding of the main generator and another field winding of the first regulating generator being connected in series in an opposite leg of the bridge circuit, means for supplying electrical energy to the bridge circuit, circuit means including a resistor connecting the armature winding of the first regulating generator across the output terminals of the electrical bridge circuit, a third field winding for the first regulating generator connected cumulatively with respect to two windings thereof in the electrical bridge circuit to be energized according to the motor armature currents, a fourth field winding for the first regulating generator differentially connected with respect to said third winding to be energized according to the drop across the motor armature winding, a second regulating generator having an armature winding and field windings, means for selectively energizing two of the field windings of the second regulating generator according to whether the motor is accelerating or braking, means for energizing a third field winding according to the motor armature currents such that the ampere turns of the third field winding are always opposed to those of the selectively energized windings, means connecting the armature winding of the second regulating generator in series with a fourth field winding thereof and a third field winding of the main generator, and a rectifier disposed to oppose the armature voltage of the second regulating generator which results from the ampere turns of the selectively energized field windings.

11. In a variable voltage drive, the combination of, a motor, a main generator for energizing the motor, field windings for the main generator, a first regulating generator, an armature winding and field windings for the first regulating generator, an electrical bridge circuit, a field winding of the main generator and a field winding of the first regulating generator being connected in series in one leg of the bridge circuit, another field winding of the main generator and another field winding of the first regulating generator being connected in series in an opposite leg of the bridge circuit, means for supplying electrical energy to the bridge circuit, circuit means including a resistor connecting the armature winding of the first regulating generator across the output terminals of the electrical bridge circuit, a third field winding for the first regulating generator connected cumulatively with respect to two windings thereof in the electrical bridge circuit to be energized according to the motor armature currents, a fourth field winding for the first regulating generator differentially connected with respect to said third winding to be energized according to the drop across the motor armature winding, a second regulating generator having an armature winding and field windings, means for selectively energizing two of the field windings of the second regulating generator according to whether the motor is accelerating or braking, means for energizing a third field winding according to the motor armature currents such that the ampere turns of the third field winding are always opposed to those of the selectively energized windings, means connecting a fourth field winding of the second regulating generator in series with its armature winding and a fifth field winding of the first regulating generator, and a rectifier disposed to oppose the armature voltage of the second regulating generator which results from the ampere turns of the selectively energized field windings.

GEORGE E. KING.